3,238,228
1,2-DICYANOOXIRANES
William Joseph Linn, Wilmington, Del., assignor to E. I. du Pont de Nemours and Company, Wilmington, Del., a corporation of Delaware
No Drawing. Filed Nov. 25, 1960, Ser. No. 71,391
9 Claims. (Cl. 260—348)

This application is concerned with, and has as its principal objects, the provision of a new class of oxiranes (olefin oxides) having a plurality of electron-attracting substituents and a process for the preparation of such compounds.

The conversion of olefinic hydrocarbons to the corresponding epoxides by reaction with organic peracids, such as perbenzoic acid and peracetic acid, is well known. Ethylene is readily converted to ethylene oxide by such processes. Substitution of alkyl and α-aryl groups in the ethylene molecule expedites epoxidation by a peracid. However, when one of the ethylenic carbon atoms carries an electron-attracting group, such as carboxyl, carbonyl, alkoxycarbonyl, or nitrile, the reaction with a peracid is either quite slow or fails completely. For the expoxidation of such substituted olefins, hydrogen peroxide in a basic medium has been found useful. With nitrile-substituted olefins, alkaline hydrogen peroxide sometimes converts the olefinic group to an expoxide, but the nitrile group is hydrolyzed to give the corresponding amide and the nitrile function is lost.

There has now been discovered a process for preparing electronegatively substituted 1,2-dicyanooxiranes by the reaction of an electronegatively substituted 1,2-dicyanoethylene with aqueous hydrogen peroxide in the presence of an inert organic liquid which is a mutual solvent for the reactants, said solvent being added in sufficient quantity to bring the reactants into intimate contact in solution in a single liquid phase at the time of reaction.

The electronegatively substituted 1,2-dicyanoethylenes suitable for use in this process are those in which the ethylenic carbon atoms carry, in addition to one cyano group on each carbon atom, at least one other electronegative substituent. The preferred ethylenic starting materials are those represented by the formulas

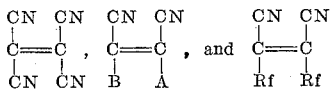

where A may be H, R, COOH, COOR, or p-phenylene-X, in which R is an alkyl radical of from 1–18 carbon atoms and X is in the para position and may be H, R, OR, halogen, or nitro; B is CN, COOH or COOR; and $R_f$ is perfluoro R. Because of their greater accessibility, starting materials in which the $R_f$ groups contain up to 13 carbon atoms are preferred.

Tetracyanoethylene is the olefin species to which the process of this invention is most particularly adapted, since the yields of tetracyanoethylene oxide are much higher with this process than in previously examined methods for preparing tetracyanoethylene oxide.

The process of this invention makes possible the preparation of a new class of polycyanooxiranes, the preferred members of which are represented by the formulas

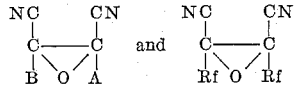

where A, B and $R_f$ are as defined above.

Hydrogen peroxide from all readily available sources is always associated with at least some water. Aqueous hydrogen peroxide for use in this invention should contain at least 3% hydrogen peroxide by weight. Concentrations of this value and above are required to produce substantial yields of the desired oxirane and also serve to keep within practical limits the amount of the mutual solvent required to produce a suitable liquid system for the reaction. Aqueous hydrogen peroxide solutions containing upwards of 90% hydrogen peroxide are known and may be employed in this invention, but the preferred range is from 3–90% hydrogen peroxide.

The molecular proportions in which hydrogen peroxide and the electronegatively substituted 1,2-dicyanoolefin are brought together in the process of this invention may be varied widely, for example, from 19:1 to 1:19 since within this range at least some of the desired oxirane will be obtained. For practical yields and reasonable economy of starting materials, it is preferred that the mole ratio of hydrogen peroxide to the cyanoethylene be at least 7:10 and preferably in the range of 7:10 to 10:3. Highest yields are obtained when the ratio is 1:1. Although it is not essential to operability, the use of a pyridine promoter is beneficial in obtaining higher yields.

The presence of an inert organic liquid which is a mutual solvent for the aqueous hydrogen peroxide and the cyanoolefin is of the essence in this invention since it is essential that, at the time the reaction takes place, the portions of the reactants which are reacting be in solution in a single liquid phase. Most water-miscible organic liquids have some utility in this process, those being preferred which are also good solvents for the selected electronegatively substituted 1,2-dicyanoolefin. Organic liquids particularly suitable as mutual solvents for this reaction include acetonitrile, acetone, tetrahydrofuran, ethylene glycol dimethyl ether, dioxane, dioxolane, methanol, and ethanol.

Pressure is not a critical factor in this process. Pressures both above and below atmospheric pressure are operable, and atmospheric pressure is preferred for convenience.

The reaction of this invention can be carried out over a wide range of temperatures. By adjusting the proportions of the several components in the reaction mixture so that none will be frozen out, temperatures as low as −80° C. may be employed. By using slightly elevated pressure to maintain the liquid phase, temperatures as high as 150° C. may be used. It is generally preferred, however, to carry out the reaction of this invention in the temperature range from −20 to +50° C.

For satisfactory yields, the pH of the reaction mixture in this invention may vary from about 1 to 8, a pH in the range close to neutral, i.e., 6–8, being preferred. However, the desired product may be obtained at a pH of up to about 10. Adjustment of the pH to the acid side may be effected by addition of a mineral acid, e.g., sulfuric acid and hydrochloric acid. Excess acid may be neutralized by the addition of sodium hydroxide or sodium carbonate.

In the following examples parts are by weight unless otherwise specified. Example I illustrates a preferred embodiment.

*Example I*

A solution of 256 parts of tetracyanoethylene in 1180 parts of acetonitrile is cooled at 0° C. and 344 parts of 30% hydrogen peroxide is added all at once. A transient violet color appears which soon fades to yellow. The solution is stirred for five minutes and diluted with 10,000 parts of ice water. The oil which separates soon solidifies and is collected by filtration and dried to give 200 parts (70% yield) of colorless crystals of tetracyanoethylene oxide. After recrystallization from ethylene dichloride, the product melts at 177–178° C. The infrared spectrum as determined in a mineral oil mull is identical with that of an authentic sample.

Example II

A solution of 256 parts of tetracyanoethylene in 1180 parts of acetonitrile is cooled to 5° C. To the stirred solution there is added a solution of 344 parts of 30% hydrogen peroxide and 1120 parts of 4 N sulfuric acid. The temperature rises to 31° C. The reaction mixture is stirred for four minutes and is then diluted with 7500 parts of ice water. The crystalline solid which separates is collected by filtration and dried to give 220 parts (76.5% yield) of colorless crystals of tetracyanoethylene oxide.

Example III

A solution of 256 parts of tetracyanoethylene in 1190 parts of acetone is cooled to 2° C. and 344 parts of 30% hydrogen peroxide is added. The temperature rises to 45° C. The reaction mixture is stirred for four minutes and diluted with 7500 parts of ice water. The precipitated solid is collected by filtration, washed with ice water, and air-dried to give 219 parts of colorless crystals of tetracyanoethylene oxide.

Example IV

A solution of 179 parts of phenyltricyanoethylene in 780 parts of acetonitrile is cooled to 5° C. and about 5 parts of pyridine is added. To the stirred solution there is added 166 parts of 30% hydrogen peroxide. The temperature rises to 18° C. The reaction mixture is stirred for 10 minutes and drowned in an excess of ice water. The solid which precipitates is collected by filtration and dried under vacuum to give 184 parts of colorless crystals. These are recrystallized from cyclohexane to give colorless needles of phenyltricyanoethylene oxide, M.P. 79–80° C.

*Analysis.*—Calcd. for $C_{11}H_5N_3O$: C, 67.69; H, 2.57; N, 21.54. Found: C, 68.04; H, 2.89; N, 21.45.

Example V

A solution of 256 parts of tetracyanoethylene in 1180 parts of absolute ethanol is cooled to +4° C. and 356 parts of 30% hydrogen peroxide is added. The temperature rises to 30° C. The reaction mixture is stirred for five minutes and diluted with 7500 parts of ice water. The resulting precipitate is collected by filtration and air-dried to give 204 parts (71% yield) of tetracyanoethylene oxide which is identified by its infrared spectrum.

Example VI

A solution of 103 parts of tricyanoethylene in 790 parts of acetone is cooled to 0° C. To the cooled solution there is added 166 parts of 30% hydrogen peroxide, at such a rate that the temperature remains around 10° C. The reaction mixture is evaporated and the residue is extracted three times with methylene chloride. The methylene chloride solution is dried and the solvent evaporated, leaving 78 parts of light yellow solid which is recrystallized from chloroform and sublimed to give colorless crystals of tricyanoethylene oxide, M.P. 76–77° C.

*Analysis.*—Calcd. for $C_5HN_3O$: C, 50.42; H, 0.85; N, 35.29. Found: C, 50.47; H, 0.90; N, 35.52.

Example VII

A solution of 256 parts of tetracyanoethylene in 890 parts of purified tetrahydrofuran is cooled to 4° C. To this solution there is added 333 parts of 30% hydrogen peroxide. The temperature rises to 30° C. The reaction mixture is poured into water and the precipitated solid is collected by filtration and dried to give 158 parts of crystalline tetracyanoethylene oxide.

Example VIII

A solution of 256 parts of tetracyanoethylene in 1180 parts of acetonitrile is stirred and cooled to 4° C. To this there is added all at once a solution of 330 parts of 30% hydrogen peroxide in 1300 parts of water (a solution approximately 6% $H_2O_2$ by weight). The temperature rises to 31° C. and an oil separates. The reaction mixture is diluted with another 7500 parts of water and the oil solidifies and is collected by filtration to give 191 parts of tetracyanoethylene oxide which is identified by its infrared spectrum.

Example IX

*Part A: Synthesis of 1,2-dicyano-1,2-di(trifluoromethyl)ethylene.*—To a stirred solution of 232 parts of phosphorus pentoxide in 1564 parts of concentrated sulfuric acid at 85–95° C. is added gradually 400 parts of commercial trifluoroacetaldehyde hydrate over a period of three hours. The gaseous trifluoroacetaldehyde which is formed is cooled to 0° C. and passed into a stirred mixture of 105 parts of hydrogen cyanide, 107 parts of diethyl ether and one part of pyridine maintained at 0–10° C. The resulting ether solution is warmed to room temperature and about 4 parts of concentrated sulfuric acid is added. Fractional distillation yields 186 parts of trifluoroacetaldehyde cyanohydrin as a colorless liquid boiling at 80–85° C./66 mm. It is stabilized by adding a trace of sulfuric acid.

To a mixture of one part of ammonium chloride and 119.2 parts of thionyl chloride which has been heated at reflux for 15 minutes and then cooled to 0–10° C. is added 127 parts of trifluoroacetaldehyde cyanohydrin and the mixture is heated at reflux for 10 hours. Fractional distillation of the product yields 129 parts of 1-cyano-2,2,2-trifluoroethylchlorosulfite boiling at 40–42° C./10 mm.

In a reactor fitted wih a large reflux tube and swept with nitrogen 200 parts of sulfur is heated until refluxing vigorously. Over a period of one hour 45.5 parts of 1-cyano-2,2,2-trifluoroethylchlorosulfite is slowly added to the refluxing vapors. The off-vapors are cooled to −80° C. The resulting condensate is warmed to room temperature to remove sulfur dioxide. The residue is first distilled at 1 mm. The condensate collected at −80° C. is fractionally distilled at atmospheric pressure to yield 14.5 parts of 1,2-dicyano-1,2-di(trifluoromethyl)ethylene boiling at 100–104° C. This is a mixture of cis and trans isomers.

The cis and trans isomers of 1,2-dicyano-1,2-di(trifluoromethyl)ethylene are separated by vapor phase chromatography at 53° C. using a column containing 40–60 mesh compacted diatomaceous earth (Fisher "Columpak") wet with 20% by weight of a silicone fluid (Dow No. 703). After separation the cis isomer is converted to the trans isomer by treatment with triethylamine.

*Part B.*—To a solution of 10.7 parts of trans 1,2-dicyano-1,2-di(trifluoromethyl)ethylene in 39.2 parts of acetonitrile is quickly added 6.34 parts of 30% hydrogen peroxide. The temperature rises to 35–40° C. After one-half hour when the mixture has cooled to room temperature, it is poured into excess water. The lower layer which separates is washed with water and dried over calcium sulfate. A fraction distilling at 70–73° C. consists of approximately 85% trans 1,2-dicyano-1,2-di(trifluoromethyl)ethylene oxide and 15% acetonitrile.

Example X

To a solution of 159 parts of 1-tert.butyl-1,2,2-tricyanoethylene in 780 parts of acetonitrile, stirred and cooled at 5° C. is added 167 parts of 30% hydrogen peroxide and about 10 parts of pyridine. The temperature rises to 15° C. After five minutes the reaction mixture is diluted with an excess of ice water. The oil which separates soon solidifies and is collected by filtration, washed with water and dried to give 133 parts of colorless crystals of 1-tert.butyl-1,2,2-tricyanoethylene oxide. A sample which is purified by sublimation and recrystallized from hexane gives colorless crystals melting at 44–45° C.

*Analysis.*—Calc'd. for $C_9H_9N_3O$: C, 61.70; H, 5.18; N, 23.99. Found: C, 61.88; H, 5.41; N, 24.03.

Example XI

To a solution of 111 parts of 1,2-dicyano-1,2-di(ethoxycarbonyl)ethylene in 500 parts of acetonitrile there is added about five parts of pyridine and 111 parts of 30% hydrogen peroxide. The temperature rises from 25° to 50° C. After two minutes the reaction mixture is diluted with ice-water. The oil which separates crystallizes and is collected by filtration, washed with water, and dried. There is obtained 111 parts of colorless crystals of 1,2-dicyano-1,2-di(ethoxycarbonyl)ethylene oxide. The product is purified by recrystallization from a mixture of ethyl ether and low-boiling petroleum ether. It melts at 61–70° C.

*Analysis.*—Calc'd. for $C_{10}H_{10}N_2O_5$: C, 50.41; H, 4.23; N, 11.76. Found: C, 50.61; H, 4.25; N, 12.09.

When the polycyanoethylenes indicated in Table I below are substituted for phenyltricyanoethylene in the process of Example IV, oxidation by hydrogen peroxide in a homogeneous system yields the indicated polycyanoethylene oxides.

TABLE I

| Polycyanoethylene Starting Material | Polycyanoethylene Oxide Product |
|---|---|
| 1-(p-chlorophenyl)-1,2,2-tricyanoethylene. | 1-(p-chlorophenyl)-1,2,2-tricyanoethylene oxide. |
| 1-(p-ethoxyphenyl)-1,2,2-tricyanoethylene. | 1-(p-ethoxyphenyl)-1,2,2-tricyanoethylene oxide. |
| 1-(p-nitrophenyl)-1,2,2-tricyanoethylene. | 1-(p-nitrophenyl)-1,2,2-tricyanoethylene oxide. |
| 1-(p-t-butylphenyl)-1,2,2-tricyanoethylene. | 1-(p-t-butylphenyl)-1,2,2-tricyanoethylene oxide. |
| 1-ethoxycarbonyl-1,2,2-tricyanoethylene. | 1-ethoxycarbonyl-1,2,2-tricyanoethylene oxide. |
| 1-carboxy-1,2,2-tricyanoethylene. | 1-carboxy-1,2,2-tricyanoethylene oxide. |
| 1,2-dicyano-1-ethoxycarbonyl-2-phenylethylene. | 1,2-dicyano-1-ethoxycarbonyl-2-phenylethylene oxide. |
| 1,2-dicyano-1-ethoxycarbonyl-2-n-hexylethylene. | 1,2-dicyano-1-ethoxycarbonyl-2-n-hexylethylene oxide. |
| 1,2-dicyano-1-ethoxycarbonylethylene. | 1,2-dicyano-1-ethoxycarbonylethylene oxide. |
| 1-carboxy-1,2-dicyanoethylene. | 1-carboxy-1,2-dicyanoethylene oxide. |
| 1-(p-stearylphenyl)-1,2,2-tricyanoethylene. | 1-(p-stearylphenyl)-1,2,2-tricyanoethylene oxide. |
| 1,2-dicyano-1-ethoxycarbonyl-2-heptadecylethylene. | 1,2-dicyano-1-ethoxycarbonyl-2-heptadecylethylene oxide. |
| 1-heptadecyl-1,2,2-tricyanoethylene. | 1-heptadecyl-1,2,2-tricyanoethylene oxide. |
| 1-(p-cetyloxyphenyl)-1,2,2-tricyanoethylene. | 1-(p-cetyloxyphenyl)-1,2,2-tricyanoethylene oxide. |
| 1-(p-bromophenyl)-2-butoxycarbonyl-1,2-dicyanoethylene. | 1-(p-bromophenyl)-2-butoxycarbonyl-1,2-dicyanoethylene oxide. |
| 1,2-dicyano-1,2-dioctyloxycarbonylethylene. | 1,2-dicyano-1,2-dioctyloxycarbonylethylene oxide. |
| 1,2-dicyano-1,2-dioctadecyloxycarbonylethylene. | 1,2-dicyano-1,2-dioctadecyloxycarbonylethylene oxide. |
| 1,2-dicyano-1,2-di(perfluorotridecyl)ethylene. | 1,2-dicyano-1,2-di(perfluorotridecyl)ethylene oxide. |

The compounds 1-(p-nitrophenyl)-1,2,2-tricyanoethylene and 1-(p-tert.butylphenyl)-1,2,2-tricyanoethylene are prepared respectively from p-nitrobenzaldehyde and p-tert.butylbenzaldehyde by condensation of the aldehyde with malononitrile followed by addition of hydrogen cyanide to give the 1,2,2-tricyanoethyl compound which is then dehydrogenated according to the aldehyde route shown by Sausen et al., J. Am. Chem. Soc., 80, 2815 (1958). The compounds 1-(p-stearylphenyl)-1,2,2-tricyanoethylene and 1-(p-chlorophenyl)-1,2,2-tricyanoethylene are prepared in the identical manner from p-stearylbenzaldehyde and p-chlorobenzaldehyde, respectively.

The compound 1-ethoxycarbonyl-1,2,2-tricyanoethylene is prepared from the known 1-ethoxycarbonyl-1,2-dicyanoethane by the steps of (a) dehydrogenation with N-bromosuccinimide to yield 1-ethoxycarbonyl-1,2-dicyanoethylene, (b) addition of hydrogen cyanide to yield 1-ethoxycarbonyl-1,2,2-tricyanoethane, followed by (c) dehydrogenation with N-bromosuccinimide to yield 1-ethoxycarbonyl-1,2,2-tricyanoethylene.

When 1-ethoxycarbonyl-1,2,2-tricyanoethane is hydrolyzed at pH 10, 1-carboxy-1,2,2-tricyanoethane is obtained which may be dehydrogenated with N-bromosuccinimide to yield 1-carboxy-1,2,2-tricyanoethylene.

1,2-dicyano-1-ethoxycarbonyl-2-phenylethylene is prepared from 1,2-dicyano-1-ethoxycarbonyl-2-phenylethane by bromination, followed by dehydrobromination.

1,2-dicyano-1-ethoxycarbonyl-2-n-hexylethylene is prepared from 1,2-dicyano-1-ethoxycarbonyl-2-n-hexylethane by bromination, followed by dehydrobromination.

1,2-dicyano-1-ethoxycarbonylethylene is prepared by bromination and dehydrobromination of the known 1,2-dicyano-1-ethoxycarbonylethane.

1-carboxy-1,2-dicyanoethylene is prepared by hydrolysis of 1,2-dicyano-1-ethoxycarbonylethane, followed by bromination and dehydrobromination.

1,2-dicyano-1-ethoxycarbonyl-2-heptadecylethylene is prepared by condensing stearaldehyde with ethyl cyanoacetate, followed by bromination and dehydrobromination of the product.

1-heptadecyl-1,2,2-tricyanoethylene is prepared by condensing stearaldehyde with malononitrile, followed by bromination and dehydrobromination.

1(p-cetyloxyphenyl)-1,2,2-tricyanoethylene is prepared by condensing p-cetyloxybenzaldehyde wth malononitrile, adding HCN and brominating and dehydrobrominating the product.

1-(p-bromophenyl)-2-butoxycarbonyl-1,2-dicyanoethylene is prepared by condensing p-bromobenzaldehyde with butyl cyanoacetate, adding HCN, and brominating and dehydrobrominating the product.

1,2-dicyano-1,2-dioctyloxycarbonylethylene and 1,2-dicyano-1,2-dioctadecyloxycarbonylethylene are prepared by esterification of cyanoacetic acid with n-octyl alcohol and n-octadecyl alcohol, respectively, and treating the resulting n-octylcyanoacetate and n-octadecylcyanoacetate with $S_2Cl_2$ or $SeO_2$.

1,2-dicyano-1,2-di(perfluorotridecyl)ethylene is prepared from the cyanohydrin of perfluorotetradecanal (ex perfluoromyristic acid) by conversion to the chlorosulfite with $SOCl_2$, followed by pyrolysis of the resulting chlorosulfite.

The electronegatively substituted 1,2-dicyanooxiranes of this invention are all useful as reducing components in rocket propellants. When intimately mixed with suitable oxidants, these cyanooxiranes yield high thrust-producing fuels. This use is illustrated in Example A.

Example A

A rocket is prepared by packing a brass cylinder, approximately 20 mm. long and 4 mm. inside diameter closed at one end and slightly constricted at the other, with an intimate mixture of 75 parts of potassium perchlorate and 40 parts of phenyltricyanoethylene oxide. The rocket is placed on an inclined metal launch and ignited at the open end with a gas flame. The mixture in the tube burns vigorously with a brilliant flame propelling the rocket from the launch.

Since obvious modifications and equivalents will appear to those skilled in the chemical arts, I propose to be bound solely by the appended claims.

The embodiments of the invention in which an exclusive property or privilege is claimed are defined as follows:

1. A 1,2-dicyanooxirane having a formula selected from the group consisting of

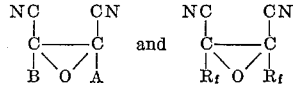

where A is selected from the group consisting of H, COOH, R, COOR and p-phenylene-X; R is an alkyl radical of from 1–18 carbon atoms; X is selected from the group consisting of H, R, OR, halogen, and $NO_2$; B is selected from the group consisting of CN, COOH and COOR; and $R_f$ is perfluoro R.

2. Phenyltricyanoethylene oxide.

3. Tricyanoethylene oxide.

4. 1,2-dicyano-1,2-di(trifluoromethyl)ethylene oxide.
5. 1-tert.butyl-1,2,2-tricyanoethylene oxide.
6. 1,2-dicyano-1,2-(ethoxycarbonyl)ethylene oxide.
7. The process of preparing polycyanooxiranes which comprises bringing a cyanoolefin selected from the group consisting of tetracyanoethylene,

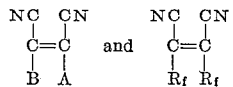

wherein A is selected from the group consisting of H, COOH, R, COOR and p-phenylene-X; R is an alkyl radical of from 1–18 carbon atoms; X is selected from the group consisting of H, R, OR, halogen and $NO_2$; B is selected from the group consisting of CN, COOH and COOR; and $R_f$ is perfluoro R; and an aqueous solution containing at least 3% hydrogen peroxide by weight; into intimate contact in an inert organic liquid which is a mutual solvent for the reactants at a pH of from about 1 to 10.

8. The process of claim 7 wherein the pH is between about 6 and 8.

9. The process of claim 8 carried out at a temperature from about $-20°$ to $+50°$ C.

References Cited by the Examiner
UNITED STATES PATENTS

| | | | |
|---|---|---|---|
| 2,724,719 | 11/1955 | Markley et al. | 260—348 |
| 2,976,301 | 3/1961 | Miller | 260—348 |
| 3,053,857 | 9/1962 | Payne | 260—348 |

FOREIGN PATENTS

| | | |
|---|---|---|
| 735,990 | 8/1955 | Great Britain. |
| 807,605 | 1/1959 | Great Britain. |

OTHER REFERENCES

Payne et al., J. Org. Chem., volume 24, pages 54–55 (1959).

Derwent Commonwealth Patent Reports, vol. 182, Gp. 1—p. 7, Australia, 50,567/59, April 8, 1960.

Payne, J. Am. Chem. Soc., vol. 81, pages 4901 to 4903 (1959).

IRVING MARCUS, *Primary Examiner.*

WALTER A. MODANCE, *Examiner.*